(12) United States Patent
Anglin et al.

(10) Patent No.: US 8,453,257 B2
(45) Date of Patent: May 28, 2013

(54) APPROACH FOR SECURING DISTRIBUTED DEDUPLICATION SOFTWARE

(75) Inventors: Matthew J. Anglin, Tucson, AZ (US); David M. Cannon, Tucson, AZ (US); Avishai H. Hochberg, San Jose, CA (US); Alexei Kojenov, Beaverton, OR (US); James P. Smith, Redwood City, CA (US); Mark L. Yakushev, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 580 days.

(21) Appl. No.: 12/541,191

(22) Filed: Aug. 14, 2009

(65) Prior Publication Data

US 2011/0040732 A1    Feb. 17, 2011

(51) Int. Cl.
*H04L 29/06* (2006.01)

(52) U.S. Cl.
USPC ............... 726/29; 726/28; 726/30; 707/692; 707/694

(58) Field of Classification Search
USPC ................. 707/687, 692, 694, 698
See application file for complete search history.

(56) References Cited

U.S. PATENT DOCUMENTS

| | | | |
|---|---|---|---|
| 6,493,796 B1 | 12/2002 | Arnon et al. | |
| 7,627,617 B2* | 12/2009 | Kavuri et al. | 1/1 |
| 2006/0123249 A1* | 6/2006 | Maheshwari et al. | 713/193 |
| 2008/0228933 A1* | 9/2008 | Plamondon | 709/230 |
| 2009/0041230 A1* | 2/2009 | Williams | 380/28 |
| 2010/0037060 A1* | 2/2010 | Irvine | 713/176 |

FOREIGN PATENT DOCUMENTS

| | | |
|---|---|---|
| JP | 2001/209226 | 1/2003 |
| WO | WO 2008/118168 A1 | 10/2008 |

OTHER PUBLICATIONS

Mark W. Storer, "Secure Data Deduplication," 10 pages, 2008.
International Search Report from International Application No. PCT/EP2010/061824, filed Aug. 13, 2010; date of mailing Oct. 13, 2010.
Athicha Muthitacharoen, "A Low-bandwidth Network File System," 2001, pp. 174-187, MIT Laboratory for Computer Science and NYU Department of Computer Science.
Mark W. Storer, "Secure Data Deduplication," Oct. 31, 2008, 10 pages, University of California, Santa Cruz.

* cited by examiner

*Primary Examiner* — Jung Kim
*Assistant Examiner* — Tri Tran
(74) *Attorney, Agent, or Firm* — Kunzler Law Group, PC

(57) ABSTRACT

The various embodiments of the present invention include techniques for securing the use of data deduplication activities occurring in a source-deduplicating storage management system. These techniques are intended to prevent fake data backup, target data contamination, and data spoofing attacks initiated by a source. In one embodiment, one technique includes limiting chunk querying to authorized users. Another technique provides detection of attacks and unauthorized access to keys within the target system. Additional techniques include the combination of validating the existence of data from the source by validating the data chunk, validating a data sample of the data chunk, or validating a hash value of the data chunk. A further embodiment involves the use of policies to provide authorization levels for chunk sharing and linking within the target. These techniques separately and in combination provide a comprehensive strategy to avoid unauthorized access to data within the target storage system.

32 Claims, 6 Drawing Sheets

Fake Backup

Contaminated Target Data

Chunk Spoofing

APPROACH FOR SECURING DISTRIBUTED DEDUPLICATION SOFTWARE

FIELD OF THE INVENTION

The present invention generally relates to data storage activities occurring within a storage management system. The present invention more specifically relates to techniques and operations used to enhance security within a deduplicating storage management environment.

BACKGROUND OF THE INVENTION

Data deduplication, the process of redundant data elimination, is becoming an important technology. Deduplication allows reduction of the required storage capacity because only unique data is stored. Additionally, source side deduplication also provides benefits such as network traffic reduction. In a typical configuration, a disk-based storage system, such as a storage-management server or VTL, has the capability to detect redundant data "extents" (also known as "chunks") and reduce duplication by avoiding the redundant storage of such extents. For example, the deduplicating storage system could divide file A into chunks a-h, detect that chunks b and e are redundant, and store the redundant chunks only once. The redundancy could occur within file A or with other files stored in the storage system.

Known techniques exist for deduplicating data objects. Typically, the object is divided into chunks using a method such as Rabin fingerprinting. Redundant chunks are detected using a hash function such as MD5 or SHA-1 to produce a hash value for each chunk and then comparing that value against values for chunks already stored on the system. Typically, the hash values for stored chunks are maintained in an index (a "deduplication" index). Hash value and chunk size are typically used to uniquely identify a chunk. If a redundant chunk is identified, that chunk can be replaced with a pointer to the matching chunk.

In a client-server storage system, the deduplication can be performed at the data source (client), the data target (server), or on a deduplication appliance connected to the target server. The ability to deduplicate data either at the source or at the target offers flexibility in respect to resource utilization and policy management. However, there are certain security risks when performing deduplication activities at a source location.

Specifically, existing methods in the prior art fail to provide storage management systems with the ability to comprehensively address fake backup, contaminated target attacks, and chunk spoofing techniques. Given the security risks inherent with storing data at a target location after source-side deduplication, an enhanced security approach within a deduplicating storage system and various strategies for client/server authentication are needed to prevent these types of attacks.

BRIEF SUMMARY OF THE INVENTION

One aspect of the present invention provides novel and effective security techniques to mitigate many of the security risks facilitated by source-side deduplication. Particularly, three types of attacks, a fake backup attack, a contaminated target data attack, and a chunk spoofing attack, are enabled by source-side deduplication, and may result in potential corruption of or unauthorized access to data stored in a storage management repository. The various embodiments of the present invention address these risks through a customizable combination of attack detection, data validation, and security policies.

The various embodiments of the present invention enable securing distributed deduplication activities in a deduplicating storage management system, the storage management system containing a source computing system (the "client", generally referred to herein as the "source") connected over a network to a target computing system (the "server", generally referred to herein as the "target"). The following operations generally apply during deduplicated storage of a data file onto the target computing system, when data file deduplication is performed by the source computing system.

Data file deduplication includes the creation of links to identical data chunks of the data file that already exist (i.e., were previously stored) within the target. The security risks of linking primarily include fake backup or chunk spoofing attacks. One embodiment of the present invention counteracts this risk by validating link creation during deduplicated storage of each data chunk of the data file.

In this embodiment, a query is received from the source inquiring whether a previously stored data chunk having a specified hash is already stored on the target. The target immediately responds with the true status of the previously stored data chunk on the target (i.e., the actual status of whether the chunk exists on the target) only if trust is established between the target and the source.

If trust is not established between the target and the source, then the target will try to detect any unauthorized access to the previously stored data chunk. This operation includes requesting the data chunk from the source; receiving and processing the requested data chunk from the source; attempting to validate the requested data chunk on the target; and finally creating a link to the previously stored data chunk on the target only if the requested data chunk is successfully validated.

In a further embodiment, the steps of requesting the data chunk, receiving the requested data chunk, and attempting to validate the requested data chunk may be repeated up to a specified number of times if the requested data chunk is not validated. Thus, the data chunk will be resent from the source until it is successfully received and validated on the target. If the requested data chunk cannot be validated within the specified number of times, the storage management system will take appropriate steps to respond to the potential attack. This includes not storing the data chunk on the target, preventing storage of the entire data file on the target, blocking some or all storage activities with the source, alerting an administrator to the potential attack, and/or modifying the level of trust existing between the source and the target. Further embodiments may also require that the source provide each requested data chunk of the entire data file to the target for validation.

In still further embodiments, contents of the requested data chunk are validated on the target. This may include the target validating that the source has provided the requested data chunk to the target, to ensure that the data chunk actually exists. In a further embodiment, validation includes the target recomputing a hash of the requested data chunk and comparing the recomputed hash with the specified hash provided by the source in the query. The target may track occurrences of the specified hash not matching the hash of the requested data chunk, and may modify the level of trust between the source and the target as appropriate if potential attacks are detected.

Further embodiments may also employ measures to prevent unauthorized disclosure of hash values and other keys to the data chunk to prevent attacks. For example, hash values communicated between the target and the source may be obscured or encrypted during transmission over the network. Additionally, hash values communicated between the target and the source may not be accessible outside of performance of the data file deduplication process.

Another embodiment of the present invention involves additional techniques that validate the specific data provided during source-side deduplication. In one embodiment, specified data is requested from the source at a defined interval during its deduplicated storage on the target. The specified data is validated by the target after it is received from the source. The data file is stored within the target only upon successful validation of the specified data, with the target data file storage activities potentially creating links to previously stored chunks on the target.

Further embodiments involve validating data produced from source-side deduplication when the target is queried to determine whether any previously stored chunks matching specified hashes provided by the source are stored on the target. The validation of the specified data includes hashing each entire data chunk on the target, such that validation of the specified data succeeds only when the specified hashes provided by the source match the hashes generated from each entire chunk of the data file on the target. In another embodiment, the specified data for validation is a sample of data from the data file provided by the source. Validating the specified data may include comparing the sample of data from the data chunk provided by the source with a sample of data stored by the target.

In further embodiments, a policy is deployed to manage linking of data chunks previously stored within the target to prevent unauthorized access to these previously stored data chunks. The true status that a previously stored data chunk exists is provided only if the source meets or exceeds a specified level of privilege. Additionally, link creation to previously stored data chunks is controlled by a policy and is only permitted for chunks generated by a source with an equal or lower policy level.

In still another embodiment, a plurality of source systems are configured to associate a policy for chunk sharing between each source computing system and chunks stored within the target computing system. Then, during deduplicated storage of a file provided by a source computing system, links to chunks previously stored on the target computing system are created according to the chunk sharing policy associated with the source computing system. In this embodiment, the source computing system cannot create links to chunks previously stored by source computing systems having a higher level of authorization as defined by the chunk sharing policy.

DETAILED DESCRIPTION OF THE INVENTION

The various aspects of the present invention relate to novel and effective techniques and combinations of techniques that can mitigate many of the security risks associated with source-side deduplication. As detailed below, the presently disclosed strategies may be employed in part or in combination as appropriate to prevent various types of attacks. These attacks include, but are not limited to, fake backup, contaminated target attacks, and chunk spoofing.

In a typical scenario, the data source and target locations conduct the following data backup protocol when performing source-side deduplication:

Step 1. Source identifies data chunk D in file F.

Step 2. Source generates a hash value h(D) for the data chunk D.

Step 3. Source queries the target to determine if the target already has a data chunk with hash value h(D) and size l(D).

Step 4. If the target responds "yes", the source simply notifies the target that chunk with hash h(D) and size l(D) is a part of file F. If the target responds "no", the source sends the data chunk D with its hash h(D) and size l(D) to the target. The target stores D in a storage repository and enters h(D) and l(D) into the deduplication index.

Step 5. If more chunks are to be processed from file F, return to Step 1.

With this protocol, the following types of attacks are possible:

1. Fake Backup

The purpose of this attack is to gain access to data that was not backed up by the user. An attacker would attempt to guess a hash value (e.g., a SHA-1 value) and the size of a chunk. In order for this attack to be effective, the attacker would need a list of hash values and chunk sizes from the deduplication index. Multiple possibilities of gaining access to the deduplication index exist. The target may provide the ability to an underprivileged user to generate a listing of hashes stored on the target, or the target may save hashes obtained from this list into a log or trace file.

Figure 1:
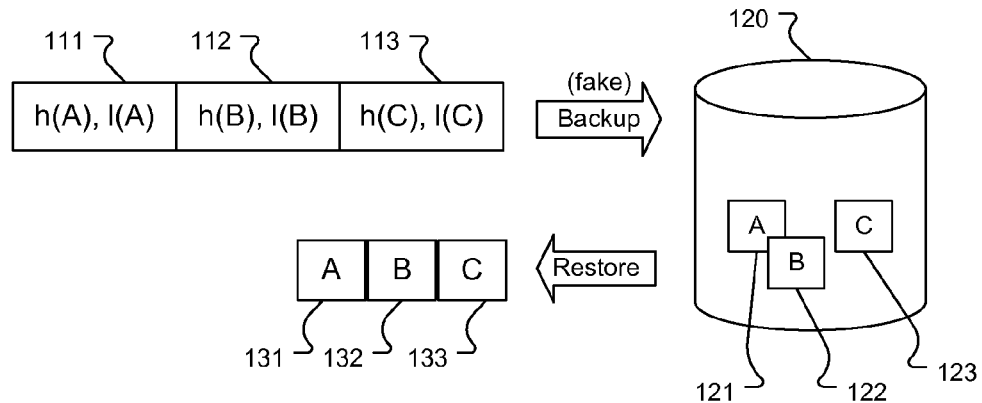
FIG. 1 depicts an example of a fake backup attack initiated upon a storage system that is addressed by various embodiments of the present invention.

As an example, FIG. 1 illustrates a fake backup operation that may be prevented through implementation of various embodiments of the present invention. An attacker has a list of valid hashes and wants to retrieve the contents of three data chunks A, B, and C from the target. To do so, the attacker pretends to back up a file consisting of these chunks. The attacker knows the hash values h(A), h(B), h(C) and chunk sizes l(A), l(B), l(C), but does not have or know the actual data within chunks A 121, B 122, and C 123. The attacker does not need to send the actual data, but instead only needs to send the hash values and chunk sizes 111, 112, 113 for deduplicated storage. The target 120 perceives this as a legitimate backup and the object will be linked to the existing chunks A 121, B 122, C 123. At a later time, the attacker can restore the object and gain access to data chunks as shown with A 131, B 132, C 133.

2. Contaminating the Target with Data Chunks Having Wrong Hashes

The purpose of this attack is to corrupt the data stored on the target. If a target server stores a chunk with a hash value that does not match the data chunk, other clients' data can be linked to this chunk during subsequent backups. This will result in a data integrity problem and backups that cannot be restored.

Figure 2:
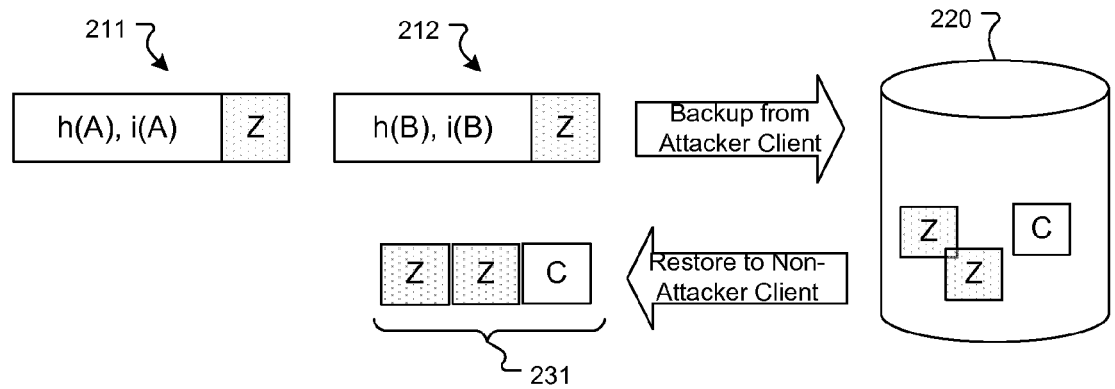
FIG. 2 depicts an example of a contaminated target data attack initiated upon a storage system that is addressed by various embodiments of the present invention.

As an example, FIG. 2 illustrates a data contamination attack that also may be prevented through implementation of various embodiments of the present invention. An attacker intentionally sends incorrect 3-tuples [hash value, chunk size, data chunk] to the target:

[h(A), l(A), Z] 211

[h(B), l(B), Z] 212

In this example, Z is some corrupt or arbitrary data such that $h(A) \neq h(Z)$ and/or $l(A) \neq l(Z)$. Similarly, $h(B) \neq h(Z)$ and/or $l(B) \neq l(Z)$. After the corrupted data has been stored on the target, when another client attempts to restore data chunks ABC from target 220, the client will receive corrupted data ZZC 231.

3. Chunk Spoofing

The purpose of this attack is to make a deduplication target confirm that valid contents of an artificially manufactured chunk exists on the target server. Thus, an attacker manufactures a data chunk and sends its hash and size to the target in order to determine if a real data chunk matching the provided hash and size exists on the target. If the target responds that the chunk has already been backed up, the attacker will have a confirmation that the manufactured chunk matches an existing chunk. Although not impossible, this attack is difficult to implement. Changing the data would change the size of the chunk, so the attacker needs to provide the correct chunk size in addition to the correct hash value.

Figure 3:
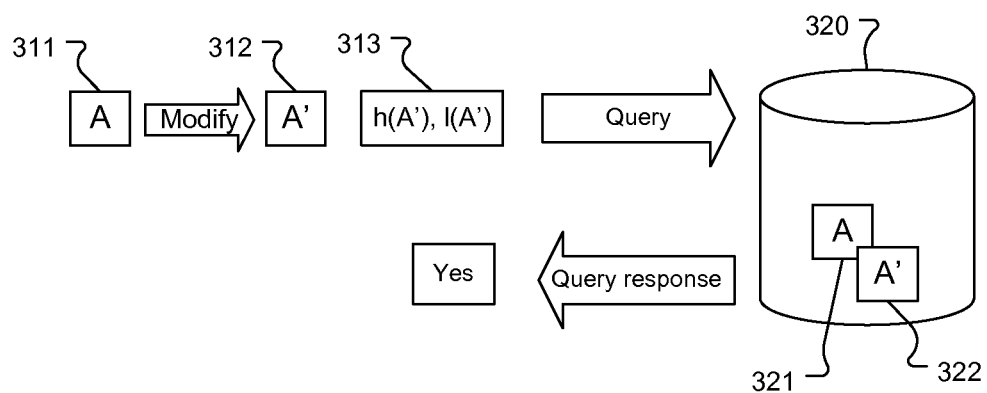
FIG. 3 depicts an example of a chunk spoofing attack initiated upon a storage system that is addressed by various embodiments of the present invention.

For example, FIG. 3 illustrates a chunk spoofing attack that also may be prevented through implementation of the various embodiments of the present invention. An attacker starts off with a data chunk A 311 that the attacker may legitimately possess. The attacker alters the content of chunk 311 slightly, to produce an illegitimate chunk A' 312, with the hash value and size of chunk 313 being h(A') and l(A') respectively. Next, the attacker issues a query to the target 320 asking if tuple [h(A'), l(A')] exists in its deduplication index. If the target responds yes, the attacker has successfully verified the existence of a data chunk 322 that he or she actually does not have. If the target responds with no, a new data chunk A' is chosen or modified and the process is repeated.

As a further example of a chunk spoofing attack, suppose the following scenario occurs with files stored on the storage system, each containing a confidential value personalized to a single employee. Employee A receives a copy of the confidential file, whose contents lists A's bonus, stating "Employee A: 100 Dollars." Employee A wants to know what Employee B's bonus is, so A generates multiple copies of the file. First, A changes the file to say "Employee B: 101 Dollars." The target responds that it does not have this file. Next, A changes the file to say "Employee B: 110 Dollars." The target again responds in the negative. This process is repeated until Employee A has created a file that the target confirms is in its possession. Thus, A has created a file that has successfully guessed the contents of another employee's bonus stored in a file on the target server.

Some of the combinable strategies for securing data activities of a client-side deduplication system according to the various embodiments of the present invention are explained generally as follows.

A. Limiting chunk querying. In one embodiment, the storage system limits chunk-querying commands only to administrators or other users with a high level of privilege. This will make fake backup attacks very difficult to implement because unauthorized users will not be able to obtain chunk hash keys. Implementation of this technique within existing storage management systems may also involve the use of methods that determine the precise authorization level of the source.

For example, only administrators with system level privileges may be given permission to issue query/show commands that display sensitive chunk information like hash values and chunk sizes. Other non-sensitive information such as the number of chunks or total size of all chunks for a backup operation can be configured for viewing/retrieval by non-system administrators and clients.

Additionally, techniques may be utilized to prevent accidental disclosure of hash values to unauthorized users and to generally prevent access of hash values outside of a legitimate deduplication operation. In one embodiment, hash values are not written in a trace file or cached on source systems. In another embodiment, hash values are encrypted or are otherwise not transmitted over the network in clear text.

B. Attack detection. Without having access to a list of valid hash values, an attacker would have to use either random values or values generated by some algorithm. To prevent this type of an attack, the target keeps track of cases where a source (client) queries the deduplication index and receives a negative response (meaning there is no chunk that matches the given hash and length) and then sends a chunk that does not match the hash (or sends no chunk at all).

In one embodiment, the target suspects an attack based on one or more such attempts of a source providing a chunk that does not match the hash or the source not sending the chunk at all. The target responds by closing the session or otherwise terminating its storage and/or retrieval operations with the source. For example, if a source asks for a hash and it turns out that the hash value does not exist on the target, the source must send the chunk, otherwise the target will generate a protocol violation error and report a potential attack. The target can also track the history of such violations and lock the source or take other appropriate action if a pattern of violations is detected.

Figure 4:
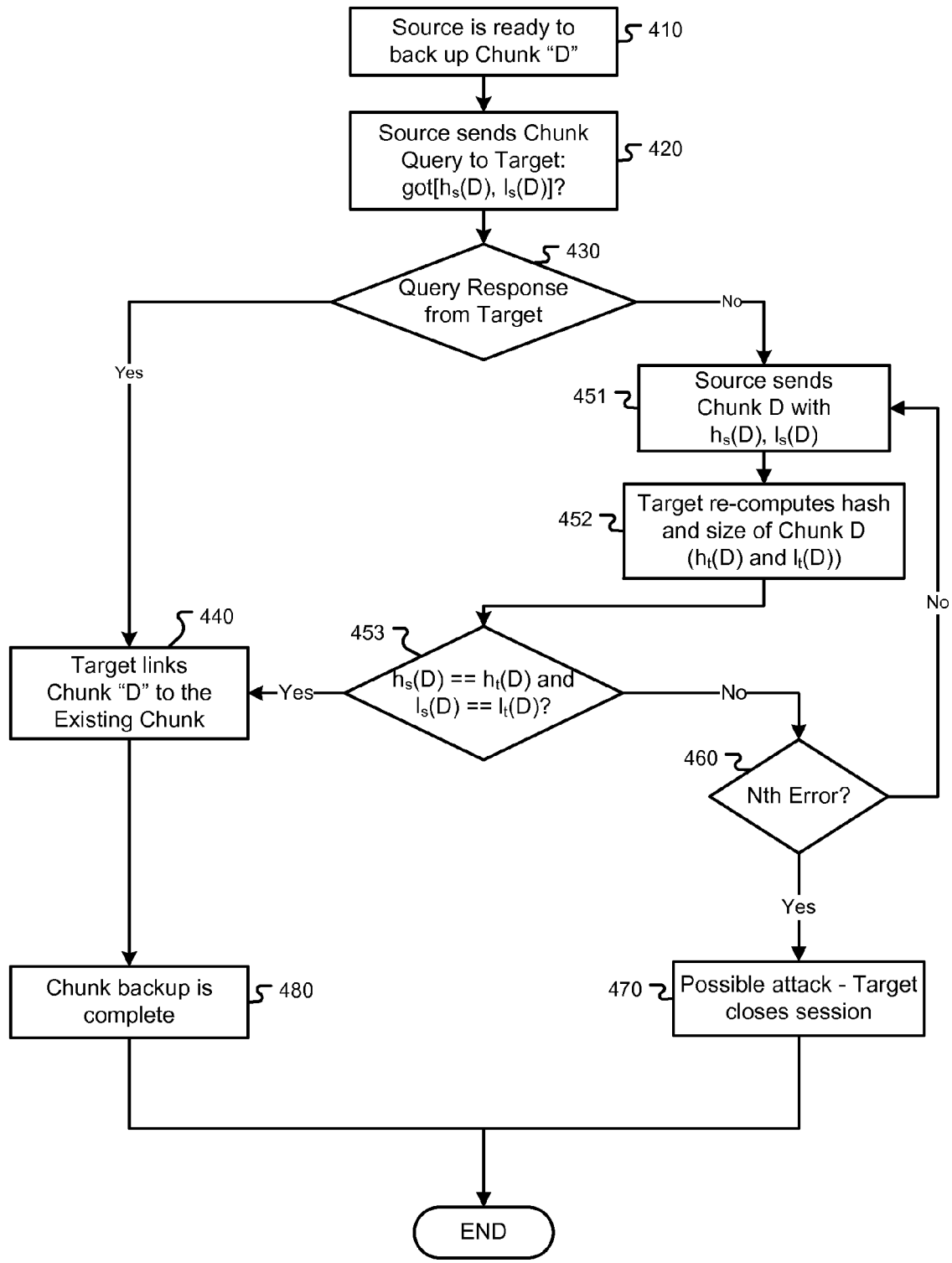
FIG. 4 depicts a flowchart illustrating an operation for detecting an attack during linking of a source-provided data chunk to an existing target-stored data chunk within a storage system according to one embodiment of the present invention.

In one embodiment, the target will try to detect an attack according to use of an algorithm. FIG. 4 depicts an example flow of this algorithm deployed within a deduplicating storage management system for linking a source-provided data chunk to a data chunk already stored within the target storage repository. As in step 410, the algorithm is initiated when the source is ready to back up chunk "D". As in step 420, the source sends a chunk query to the target asking whether it has a chunk with a key consisting of the hash and length of chunk D: got[$h_s(D)$, $l_s(D)$]?

In the query response of step 430, if the target immediately responds with "yes", indicating that the target already has stored an existing copy of this chunk within its storage, then the target will proceed with linking the object to the existing chunk as in step 440. A "no" query response from the target does not necessarily mean that the target does not have the chunk. Rather, this response can initiate a simple way to apply attack detection techniques to the storage operation with the untrusted source.

In one embodiment, if the target immediately responds with "no", this suggests that the target does not have the chunk with this hash/length key combination (but more precisely, the target does not want to confirm that it has a chunk with this hash/length key combination to an untrusted source). The source is then required to send the data chunk in order to proceed with the backup operation. As in step 451, the source sends Chunk D with key $[h_s(D), l_s(D)]$ to the target. At this point, the source thinks that the target does not already store this chunk.

The validation algorithm involves the target re-computing the hash and size values of Chunk D as in step 452, and comparing if $h_s(D)$ is equal to $h_t(D)$, and if $l_s(D)$ is equal to $l_t(D)$ as in step 453. If equal, then the provided chunk hash value and length have been validated and no attack has been detected. The target can discard the data chunk D sent by the source and link the chunk to the one that the target has previously stored as in step 440. This completes the chunk backup operation as in step 480. If the hash and size values are not equal, then the validation process is repeated for a defined number of times, until the Nth error occurs as in step 460. Once the Nth time is reached, a possible attack has been detected. The target can then take appropriate measures, such as closing the session with the source as in step 470.

In further embodiments, the number of times that a matching error occurs is tracked on an entire file basis or according to the source that is providing the chunk. This technique is primarily used to detect a contamination attack. By calculating the hash again on the target and comparing that hash to the value provided by the source, the target can detect when the source is trying to send it bogus data.

In another embodiment, the detection technique described above can be modified in order to detect a fake backup operation. In a fake backup scenario, the source does not actually have the data, so it cannot send it when prompted by the target. A fake backup attack may therefore be detected if the source issues queries for lengths/hash values but never sends the associated data after being prompted to do so. In one embodiment, detection involves tracking on the target a list of all chunks queried by the source for which the server responds that it does not have the chunk. If the source does not send all of the chunks in the list, then the target can determine that the source is "phishing" for chunks. For example, if the target indicates that it does not have chunks A, B, C, and D, but the source only sends up chunks A, B, and C, then the target may surmise that chunk D was a phishing attempt.

As further discussed below, additional data validation techniques can also be used in conjunction with the previously described client authentication and attack detection processes.

C. Data chunk validation. As suggested above, until trust is established between a source client and a target server, the target server can be configured to intentionally respond with "no" to some chunk queries even if the chunk already exists on the target. This is conducted in an effort to force the source to send the chunk, and thereby used to prevent a fake backup attack. In one embodiment, data chunk validation can be configured as a heuristic, such that the target can ask for every Nth chunk, possibly increasing the frequency if violations have previously been detected for this source.

Figure 5:
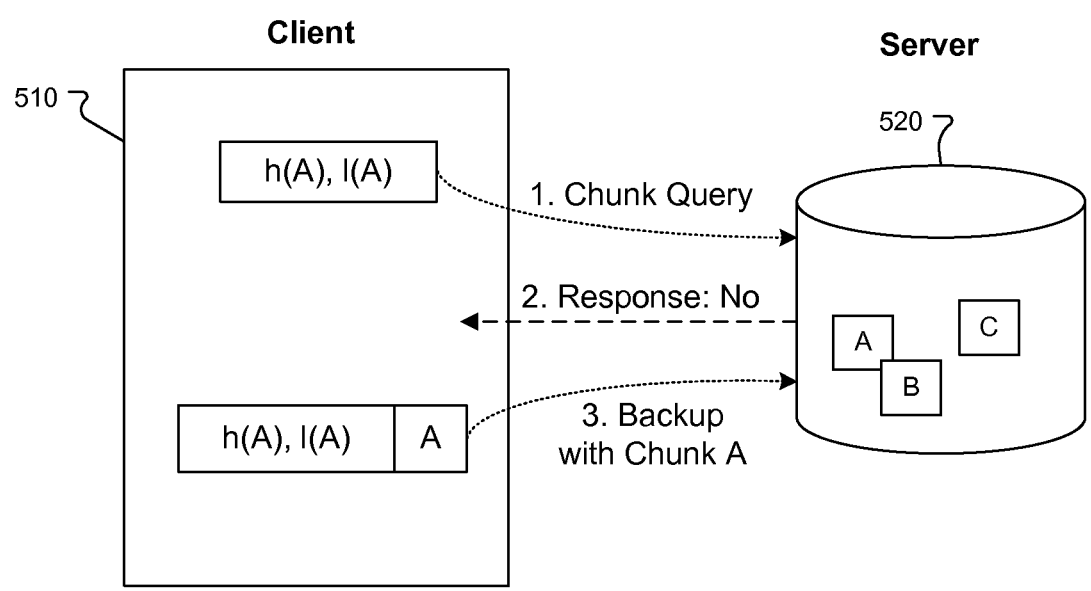
FIG. 5 depicts a verification operation performed within a storage system used to verify the existence of the data chunk within the source and detect a potential attack according to one embodiment of the present invention.

FIG. 5 depicts the use of a data chunk validation technique according to one embodiment of the present invention. As shown, the source client 510 issues a chunk query for a status of the chunk, requesting that the target server 520 indicate if a chunk tied to the hash value h(A) and size l(A) is stored. The target server 520 responds with a "No" response, even though the chunk "A" is in actuality stored in its data store. This will force the source client 510 to proceed with providing the chunk A to the target server 520 as if it did not already exist on the target.

Using this technique, the target can arbitrarily (or at some predefined interval) force the source to send a data chunk to verify that the source actually possesses the data and has not been trying to guess a hash value. Additionally, this technique can be combined with features of the chunk hash validation process depicted in FIG. 4.

D. Data sample validation. When a source attempts to back up a chunk with hash value h and size l and the target has the [h, l] 2-tuple in its deduplication index, the target may use the following method to confirm that the source has a valid copy of the data that it claims to back up. The target asks the source to provide a sample of the data chunk, with this sample comprising all or part of the chunk, such as a certain number of bytes from an arbitrary offset in the data chunk. The target then compares this data sample with additional data stored in the deduplication index. Only if the sample sent by the source matches the data on the target will the target accept the operation as a valid backup.

Below is the algorithm for one embodiment utilizing a data sample validation technique:

1. The source sends the query to the target, listing a number of hash values and sizes $\{[h_1, l_1], [h_2, l_2] \ldots [h_M, l_M]\}$ for the chunks the source has (or pretends to have).

2. The target sends a response for each entry in the list indicating whether it is in the deduplication index, but also includes an offset and length in the response. These represent a random subset of the data that has been stored in the database record for the chunk. For a chunk with size l(i), and hash value h(i), the target may return a response such as, "Yes, I have your chunk, and it has an ID of I. Validate by sending me N bytes from offset O in the chunk." N can be any number from 0 to l(i), and O would be some random number, for example, from 50-80.

3. When the source provides the chunk references (i.e., the hash and length values) to piece together this object, it will need to include the bytes from offset O as required by the target. In a further embodiment, it may be advantageous to try to make N somewhat predictable internally, to enable the source client to cache data "around" the requested bytes, so that it does not need to constantly re-read data from disk. For example, the source client may cache 400 bytes from some predetermined location in the chunk, and the target server may ask for any 83 bytes, for example, in that 400 byte range. The location of the cache point could be a function of the matching chunk object ID along with some data within the chunk.

Ultimately, with use of a data sample validation, the attacker needs to already have and also provide legitimate data to the target. In a robust implementation, this prevents a fake backup attack from being successfully implemented on a target storage server.

E. Hash validation. As described above, steps 451-453 of FIG. 4 depict an example operation having the target re-compute hash values on the incoming data according to one embodiment of the present invention. This data validation technique involves recomputing a hash on incoming data, specifically, the entire data chunk.

During a hash validation operation, the target generates a hash value on the incoming data and matches it with the hash value sent by the source. Chunk verification is an expensive operation and may require decompressing a chunk before its hash is generated on the target. In one embodiment, hash validation may be performed selectively based on the past history of any violations from the source, or other establishments of trust with the source. A robust implementation of hash validation on chunks also has the effect of preventing contamination of the target with data chunks correlating to incorrect hashes.

F. Chunk security policy. In one embodiment, the target establishes a policy for chunk sharing, and manages the ability to link to existing chunks within the target based on a predefined level of established trust. A robust implementation of this policy eliminates the possibilities of chunk spoofing. As an example, each source client may be assigned an authorization level (0-N). Source clients with lower levels are then not permitted to link to chunks generated by source clients with higher level of authorization within the target deduplicated storage.

Chunk-level security may be implemented by adding additional information within the deduplication index, such as through use of an additional data column. This column would indicate the source (client) that was the originator of the data chunk. When chunk matching is performed by the target in response to a source's chunk query, the source's authorization level will be taken into account. Therefore, the chunk query will only return deduplication index entries (i.e., hash values and chunk sizes) for chunks created by sources having the same or lower authorization level, so that links can be only created to chunks from source clients of the same or lower authorization level.

Figure 6:
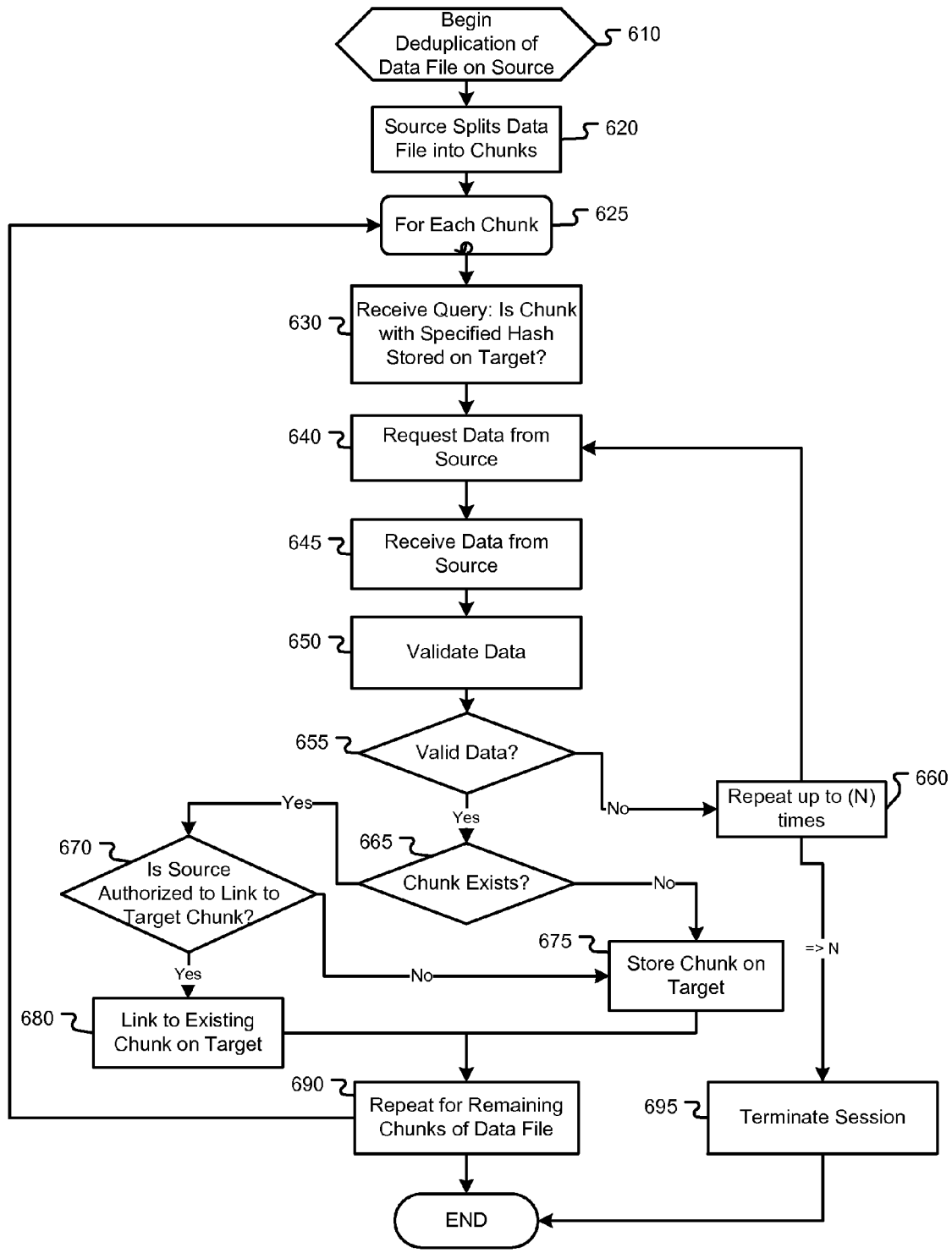
FIG. 6 depicts a flowchart for implementing an operation for securing distributed deduplication activities in a deduplicating storage management system through data validation according to one embodiment of the present invention.

FIG. 6 depicts a flowchart for securing distributed deduplication activities in a deduplicating storage management system through the previously described data validation techniques according to one embodiment of the present invention. As shown, deduplication of a data file begins on a source as in 610, which first involves splitting the data file into various chunks for deduplication as in step 620. The following steps are then repeated as a part of storing each data chunk of the data file on the target in a deduplicated fashion as in step 625.

The target receives a normal query from the source regarding the data chunk as in step 630, inquiring whether the chunk with a specified hash value and size is stored on the target. Instead of responding with an affirmative answer, the target takes steps to act as if it does not already store the data chunk even if in fact it does. The target responds "no" and requests data from the source as in step 640. The source will then transmit the information to the target and target will receive data from the source as in step 645.

The data received at the target server is validated as in 650, consistent with one or a combination of the validation techniques described within the present disclosure. As non-limiting examples, these techniques may include validating of a sample of the data chunk with a sample already stored by the target, validating the hash of the entire data chunk with a hash tracked by the target, validating that some data was actually provided by the source, and the like. If the data validation step 655 fails, then the verification process is repeated for up to N times as in step 660 in an attempt to obtain another valid copy of the chunk. If no valid data is provided within N times, then an attack is detected and the client session is terminated by the target as in step 695. In further embodiments, other appropriate measures can be taken on the basis of the attack, such as logging or alerting an administrator to the attack, not responding to the source for a period of time, or even banning communication with the source permanently.

In the case that the data provided by the source is validated as in step 655, then the backup operation of the data chunk commences on the target. If the chunk truly does exist as in step 665, then a link is created to the existing chunk on the target as in step 680. If the chunk does not exist as in step 665, then the data chunk obtained from the source is stored on the target as in step 675. The overall data validation process is then repeated for any remaining chunks of the data file as in step 690.

In further embodiments, based on the authorization level of the source, during step 670 links can only be created to existing chunks provided by a source with an authorization level equal or greater than the source of the existing chunk. Thus, if a chunk existing on the target was provided by a source with a high authentication level, then a source with a lower authorization will not be able to link to this chunk, but will instead need to store its own copy of the chunk as in step 675 or link to a chunk of an equal or lesser authorization level on the target during step 680.

Figure 7:
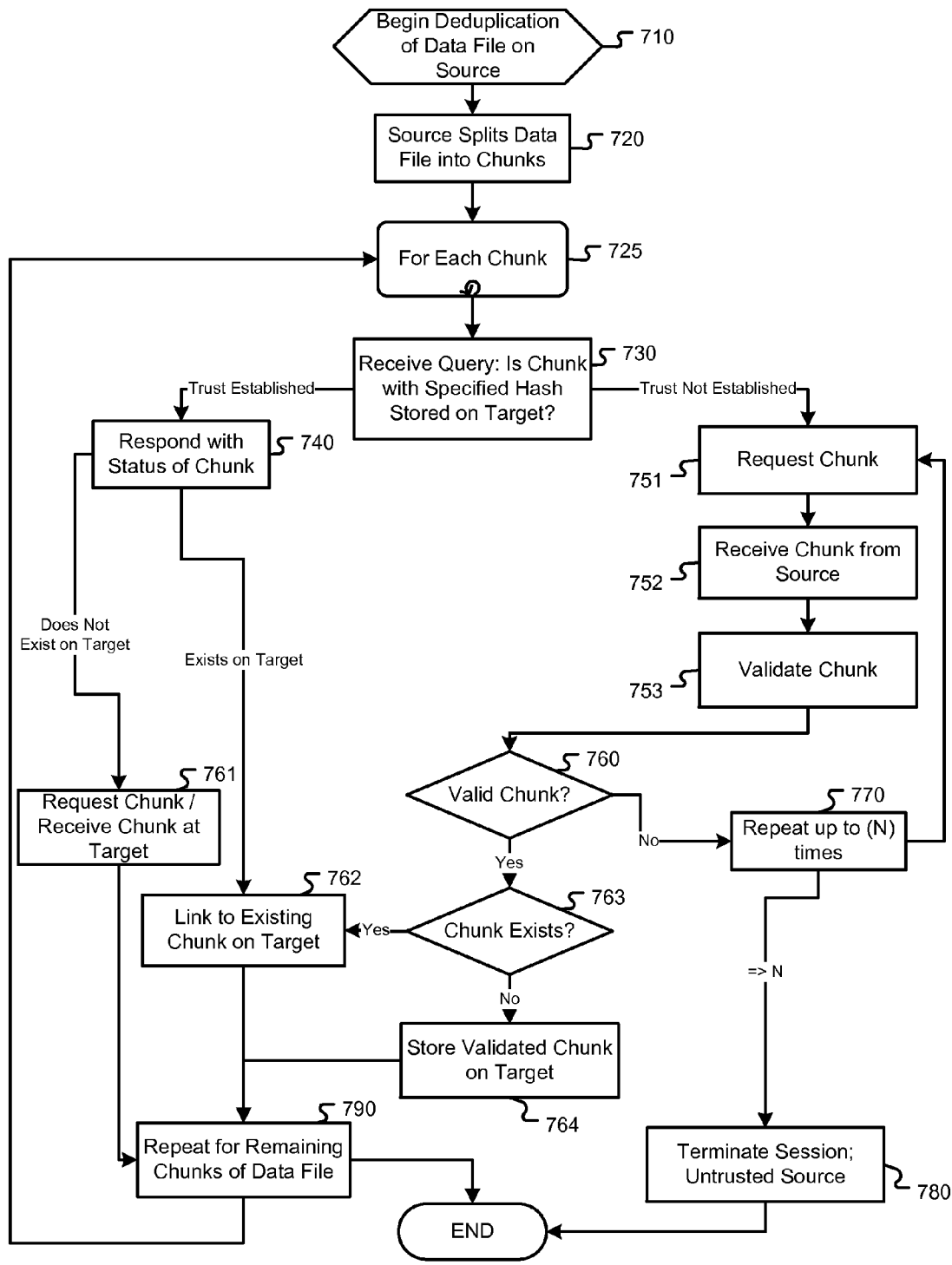
FIG. 7 depicts a flowchart for implementing an operation for securing distributed deduplication activities in a deduplicating storage management system through attack detection and data validation operations according to one embodiment of the present invention.

FIG. 7 depicts a flowchart for securing distributed deduplication activities in a deduplicating storage management system through attack detection and data validation operations according to one embodiment of the present invention. Similar to the operation depicted in FIG. 6, the data file is deduplicated on the source as in step 710 by splitting the data file into chunks as in step 720, and then repeating the following deduplication operation for each data chunk as in step 725.

As in step 730, the target server receives a query from the source to determine whether a chunk matching a specified hash and size is stored on the target. The response from the target is dependent on whether trust has been established with the source. If trust is established, the target will respond with the true status of the chunk as in step 740. If trust is not established, the target will initiate steps to receive a copy of the chunk from the untrusted source, such as by replying to the query with a response that the chunk is not stored on the target (even if it actually is stored).

In the case that trust is not established with the source, the chunk is requested from the source as in step 751. The chunk data is transmitted from the source and received at the target as in step 752. The chunk data transmitted to the target is then validated as in step 753. According to the specific validation operation performed on the chunk provided (such as rehashing the entire chunk, validating a sample of the chunk, or simply validating that some chunk data was transmitted from the source to the target) as in step 760, the chunk is determined as valid or invalid.

If the chunk is determined by the target to be invalid, then the operation is repeated for a predetermined number of times, such as up to "N" times as in 770. This gives the source additional opportunities to send the correct data and remedy an incorrect transmission. If the source is unable to provide the target with valid data within the specified number of times "N", then the target has detected potential unauthorized access to its data. The session between the target and the source is then terminated as in step 780. In one embodiment, the entire data backup session is terminated, causing the backup operation to end even if only one chunk is not provided by the source. In further embodiments, the source may be temporarily or permanently recognized as an untrusted source to prevent the source from repeating attacks with changed or spoofed data.

In the case that successful validation occurs for the chunk provided by the source as in step 760, the backup operation of the chunk can proceed on the target. If the chunk has been validated from an untrusted source, and the chunk does not yet exist on the target per step 763, then it is stored as in step 764. In the case that the chunk has been validated per step 763 but the chunk exists on the target, then a link is created to the existing chunk on the target as in step 762.

Similarly, if trust was previously established with the source and the chunk does not exist on the target per step 740, then the target will request the chunk and receive the chunk at the target as in step 761. In the case that trust was previously established with the source and the chunk already exists on the target per step 740, then only a link to the existing chunk on the target needs to be created as in step 762. Once the chunk is backed up to the target successfully, the process can be repeated for remaining chunks of the data file as in step 790.

Those skilled in the art would recognize that numerous combinations and modifications may be made to the data backup, validation, and attack detection procedures described above. Further, policies establishing levels of authentication for linking chunks among the various sources may be combined with the data validation and attack detection techniques suggested above. Additionally, a storage management system may be configured to use additional techniques to track the status of trustworthiness of a source, or the trustworthiness of specific chunks and data files obtained from a source.

As will also be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module", or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method for securing distributed deduplication activities in a deduplicating storage management system, the storage management system containing a source computing system connected over a network to a target computing system, the method comprising:

receiving, by use of a processor, a query from the source computing system inquiring whether a previously stored data chunk having a specified hash and a specified length corresponding to a source-provided data chunk of a data file is stored on the target computing system;

responding with a status of the previously stored data chunk on the target computing system if trust is established between the target computing system and the source computing system;

detecting unauthorized access to the previously stored data chunk on the target computing system if trust is not established between the target computing system and the source computing system by:

responding that the previously stored data chunk is not stored on the target computing system if the previously stored data chunk is stored on the target computing system and trust is not established between the target computing system and an authorization level for the source computing system is less than an authorization level for the stored data chunk;

requesting the source-provided data chunk from the source computing system;

receiving the requested data chunk from the source computing system;

validating the requested source-provided data chunk on the target computing system;

creating a link from the source-provided data chunk to the previously stored data chunk on the target computing system if the requested source-provided data chunk is validated; and closing deduplication from the source computing system to the target computing system if the requested source-provided data chunk is not validated.

2. The method of claim 1, wherein if the source-provided data chunk is not stored on the target computing system as the previously stored data chunk, then the source-provided data chunk is stored on the target computing system if the source-provided data chunk is validated and the source provided data chunk is not stored on the target computing system if the requested data chunk is not validated.

3. The method of claim 1, wherein creating the link to the previously stored data chunk on the target computing system occurs only if the source computing system meets or exceeds a specified level of privilege.

4. The method of claim 1, wherein validating the requested source-provided data chunk on the target computing system comprises the target computing system validating that the source computing system has provided the requested source-provided data chunk to the target computing system.

5. The method of claim 1, wherein the data file is not stored on the target computing system if the source computing system does not provide each requested data chunk of the data file to the target.

6. The method of claim 1, wherein validating the requested data chunk on the target computing system comprises the target computing system generating a second hash and a second length of the requested source-provided data chunk, and wherein validation of the requested source-provided data chunk succeeds only if the specified hash provided by the source computing system matches the second hash of the requested data chunk and if the specified length matches the second length.

7. The method of claim 6, wherein the target computing system tracks occurrences of the specified hash not matching the second hash of the requested data chunk.

8. The method of claim 1, wherein any hash values communicated between the target computing system and the source computing system are encrypted during transmission over the network.

9. The method of claim 1, wherein any hash values communicated between the target computing system and the source computing system are not accessible outside of performance of the data file deduplication.

10. The method of claim 1, wherein each of a plurality of source computing systems has a policy level and the source-provided data chunk is only linked to the previously stored data chunk if the previously stored data chunk is from a source computing system with an equal or lower policy level than the policy level of the source computing system.

11. A method for securing distributed deduplication activities in a deduplicating storage management system, the storage management system containing a source computing system and a target computing system, the method comprising:

deduplicating, by use of a processor, a data file into source-provided data chunks within the storage management system, wherein deduplication of the data file is performed by the source computing system prior to storage of data chunks of the deduplicated data file on the target computing system;

responding that a first stored data chunk is not stored on the target computing system in response to a request to store the first source-provided data chunk if the first source-provided data chunk is stored on the target computing system and trust is not established between the target computing system and an authorization level for the source computing system is less than an authorization level for the stored data chunk;

requesting the first -provided data chunks from the source computing system at a defined interval;

receiving the first source-provided data chunk having a specified hash and a specified length from the source computing system;

validating the first source-provided data chunk if a trust relationship is not established between the target computing system and the source computing system;

storing the first source-provided data chunk on the target computing system responsive to successful validation of the first source-provided data chunk; and closing deduplication from the source computing system to the target computing system if the first source-provided data chunk is not validated.

12. The method of claim 11, wherein the request for the first source-provided data chunk from the source computing system occurs in response to a query from the source computing system inquiring whether a previously stored data chunk with the specified hash and the specified length is stored on the target computing system.

13. The method of claim 11, wherein the first source-provided data chunk is validated if the specified hash of the first source-provided data chunk matches a second hash of a previously stored data chunk on the target computing system and the specified length matches a second length of the previously stored data chunk.

14. The method of claim 11, wherein the first source-provided data chunk is validated if the source-provided data chunk matches a previously stored data chunk on the target computing system having the specified hash and the specified length.

15. The method of claim 14, wherein each of a plurality of source computing systems has a policy level and the first source-provided data chunk is only linked to the previously stored data chunk if the previously stored data chunk is from a source computing system having an equal or lower policy level.

16. A method for securing distributed deduplication activities in a storage management system, the storage management system containing a plurality of source computing systems and a target computing system, the method comprising:
receiving, by use of a processor, a query from the source computing system inquiring whether a previously stored data chunk having a specified hash, and specified length corresponding to a source-provided data chunk of a data file is stored on the target computing system, wherein a policy is associated with the source-provided data chunk;
responding with a status of the previously stored data chunk on the target computing system if trust is established between the target computing system and the source computing system;
detecting unauthorized access to the previously stored data chunk on the target computing system if trust is not established between the target computing system and the source computing system by:
responding that the previously stored data chunk is not stored on the target computing system if the previously stored data chunk is stored on the target computing system and trust is not established between the target computing system and an authorization level for the source computing system is less than an authorization level for the stored data chunk;
requesting the source-provided data chunk from the source computing system;
receiving the requested data chunk from the source computing system;
validating the requested source-provided data chunk on the target computing system;
creating a link from the source-provided data chunk to the previously stored data chunk on the target computing system if the requested source-provided data chunk is validated; and
closing deduplication from the source computing system to the target computing system if the requested source-provided data chunk is not validated.

17. A storage management system, comprising:
a source computing system connected over a network to a target computing system;
at least one processor within the storage management system; and
at least one memory within the storage management system storing instructions operable with the at least one processor for securing distributed deduplication activities in the storage management system, the instructions being executed for:
receiving a query from the source computing system inquiring whether a previously stored data chunk having a specified hash and a specified length corresponding to a source-provided data chunk of a data file is stored on the target computing system;
responding with a status of the previously stored data chunk on the target computing system if trust is established between the target computing system and the source computing system;
detecting unauthorized access to the previously stored data chunk on the target computing system if trust is not established between the target computing system and the source computing system by:
responding that the previously stored data chunk is not stored on the target computing system if the previously stored data chunk is stored on the target computing system and trust is not established between the target computing system and an authorization level for the source computing system is less than an authorization level for the stored data chunk;
requesting the source-provided data chunk from the source computing system;
receiving the requested source-provided data chunk from the source computing system;
validating the requested source-provided data chunk on the target computing system;
creating a link from the source-provided data chunk to the previously stored data chunk on the target computing system if the requested source-provided data chunk is validated; and
closing deduplication from the source computing system to the target computing system if the requested source-provided data chunk is not validated.

18. The storage management system of claim 17, wherein if the source-provided data chunk is not stored on the target computing system as the previously stored data chunk, the source-provided data chunk is stored on the target computing system if the source-provided data chunk is validated and the source provided data chunk is not stored on the target computing system if the requested data chunk is not validated.

19. The storage management system of claim 17, wherein creating the link to the previously stored data chunk on the target computing system occurs only if the source computing system exceeds a specified level of privilege.

20. The storage management system of claim 17, wherein validating the requested source-provided data chunk on the target computing system comprises the target computing system validating that the source computing system has provided the requested source-provided data chunk to the target computing system.

21. The storage management system of claim 17, wherein the data file is not stored on the target computing system if the source computing system does not provide each requested data chunk of the data file to the target computing system.

22. The storage management system of claim 17, wherein validating the requested data chunk on the target computing system comprises the target computing system generating a second hash and a second length of the requested source-provided data chunk, and wherein validation of the requested source-provided data chunk succeeds only if the specified hash provided by the source computing system matches the second hash of the requested data chunk and if the specified length matches the second length.

23. The storage management system of claim 22, wherein the target computing system tracks occurrences of the specified hash not matching the second hash.

24. The storage management system of claim 17, wherein any hash values communicated between the target computing system and the source computing system are encrypted during transmission over the network.

25. The storage management system of claim 17, wherein any hash values communicated between the target computing system and the source computing system are not accessible outside of performance of the data file deduplication.

26. The storage management system of claim 17, wherein each of a plurality of source computing systems has a policy level and the source-provided data chunk is only linked to the previously stored data chunk if the previously stored data chunk is from a source computing system with an equal or lower policy level.

27. A storage management system, comprising:
a source computing system; a target computing system;
at least one processor within the storage management system; and
at least one memory within the storage management system storing instructions operable with the at least one processor for securing distributed deduplication activities in the storage management system, the instructions being executed for:
deduplicating a data file into source-provided data chunks within the storage management system, wherein deduplication of the data file is performed by the source prior to storage of the deduplicated data file on the target;
requesting the first source-provided data chunks from the source computing system at a defined interval;
responding that a first stored data chunk is not stored on the target computing system in response to a request to store the first source-provided data chunk if the first source-provided data chunk is stored on the target computing system and trust is not established between the target computing system and an authorization level for the source computing system is less than an authorization level for the stored data chunk;
receiving the first source-provided data chunk with a specified hash and specified length from the source computing system;
validating the first source-provided data chunk if a trust relationship is not established between the target computing system and the source computing system; and
storing the first source-provided data chunk on the target computing system responsive to successful validation of the first source-provided data chunk; and
closing deduplication from the source computing system to the target computing system if the first source-provided data chunk is not validated.

28. The storage management system of claim 27, wherein the request for the first source-provided data chunk from the source computing system occurs in response to a query from the source computing system inquiring whether a previously stored data chunk with the specified hash and the specified length is stored on the target computing system.

29. The storage management system of claim 27, wherein the first source-provided data chunk is validated if the specified hash matches a second hash of the first source-provided data chunk generated by the target computing system and the specified length matches a second length of the first source-provided data chunk generated by the target computing system.

30. The storage management system of claim 27, wherein the first source-provided data chunk is validated if the specified length matches a second hash of a previously stored data chunk and if the specified length matches a second length of the previously stored data chunk.

31. The storage management system of claim 27, wherein each of a plurality of source computing systems has a policy level and the first source-provided data chunk is only linked to a previously stored data chunk if the previously stored data chunk is from a source computing system having an equal or lower policy level.

32. A storage management system, comprising:
plurality of source computing systems; a target computing system;
at least one processor within the storage management system; and
at least one memory within the storage management system storing instructions operable with the at least one processor for securing distributed deduplication activities in the storage management system, the instructions being executed for:
receiving a query from the source computing system inquiring whether a previously stored data chunk having a specified hash and specified length corresponding to a source-provided data chunk of a data file is stored on the target computing system, wherein a policy is associated with the source-provided data chunk;
responding with a status of the previously stored data chunk on the target computing system if trust is established between the target computing system and the source computing system;
detecting unauthorized access to the previously stored data chunk on the target computing system if trust is not established between the target computing system and the source computing system by:
responding that the previously stored data chunk is not stored on the target computing system if the previously stored data chunk is stored on the target computing system and trust is not established between the target computing system and an authorization level for the source computing system is less than an authorization level for the stored data chunk;
requesting the source-provided data chunk from the source computing system;
receiving the requested data chunk from the source computing system;
validating the requested source-provided data chunk on the target computing system;
creating a link from the source-provided data chunk to the previously stored data chunk on the target computing system if the requested source-provided data chunk is validated; and
closing deduplication from the source computing system to the target computing system if the requested source-provided data chunk is not validated.

* * * * *